(12) United States Patent
Arnaud et al.

(10) Patent No.: US 6,650,662 B1
(45) Date of Patent: Nov. 18, 2003

(54) METHOD AND SYSTEM FOR TRANSMITTING A DTMF SIGNAL WITH COMPRESSED VOICE IN A PACKET SWITCHING NETWORK

(75) Inventors: Charles Arnaud, Villeneuve-Loubet (FR); Claude Cesaro, Le Cannet (FR); Gerard Richter, Saint-Jeannet (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/149,913

(22) Filed: Sep. 9, 1998

(30) Foreign Application Priority Data

Dec. 12, 1997 (EP) .............................................. 97480091

(51) Int. Cl.[7] .............................. H04J 3/12; H04L 12/66
(52) U.S. Cl. ...................................... 370/526; 370/352
(58) Field of Search ................................. 370/352, 353, 370/354, 355, 356, 252, 526; 379/283, 286, 351, 90.01, 93.01, 93.08, 93.09, 93.15, 93.26; 375/240

(56) References Cited

U.S. PATENT DOCUMENTS

| | | | | |
|---|---|---|---|---|
| 4,189,625 A | * | 2/1980 | Strandberg | 375/240 |
| 5,140,627 A | | 8/1992 | Dahlin | 379/60 |
| 5,666,357 A | | 9/1997 | Jangi | 370/345 |
| 5,889,851 A | * | 3/1999 | Hsieh | 379/351 |
| 6,122,353 A | * | 9/2000 | Brady et al. | 379/142 |
| 6,226,303 B1 | * | 5/2001 | Levens et al. | 370/526 |

* cited by examiner

Primary Examiner—Steven Nguyen
(74) Attorney, Agent, or Firm—Carlos Munoz-Bustamante

(57) ABSTRACT

The present invention discloses a system and a method for transmitting DTMF signals over high speed digital networks using voice compression algorithms, and particularly to a system for ensuring the integrity of DTMF signals at the destination node of a network after compression and decompression of data on a voice connection. A DTMF Detector is placed in parallel with a voice compression unit performing the compression algorithm. When a candidate DTMF signal is detected, the signal component at the higher frequency in the candidate is filtered out to eliminate the possibility of double DTMF detection at end user equipment. When the candidate DTMF signal is finally validated by the source node as representing a true DTMF signal, only the data essential for reconstituting the DTMF signal are transferred to the destination node.

4 Claims, 12 Drawing Sheets

FIG. 4

| 401 | 402 | 403 | 404 | 405 |
|---|---|---|---|---|
| Packet id | Key | Type | Energy 1 | Energy 2 |

*400*

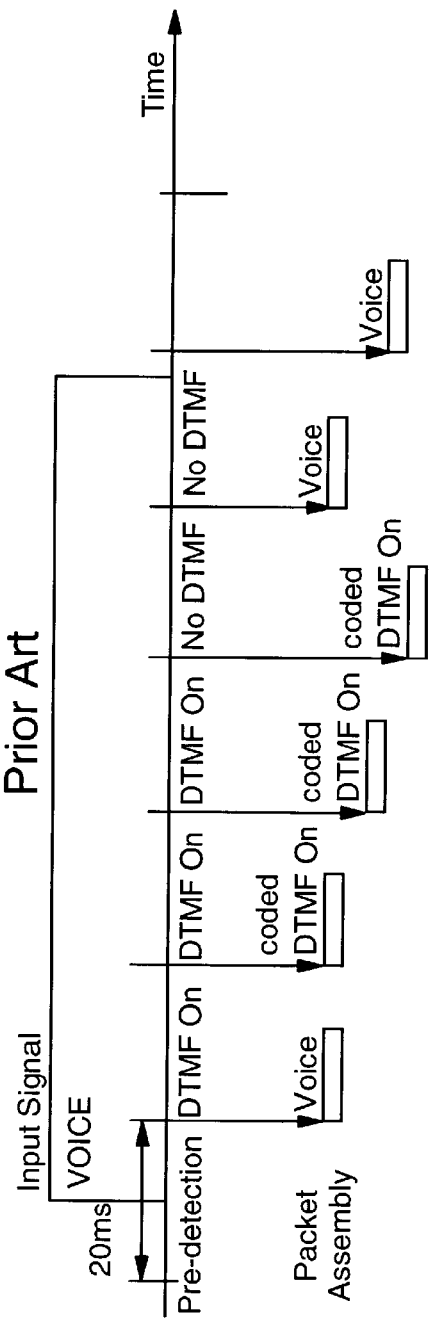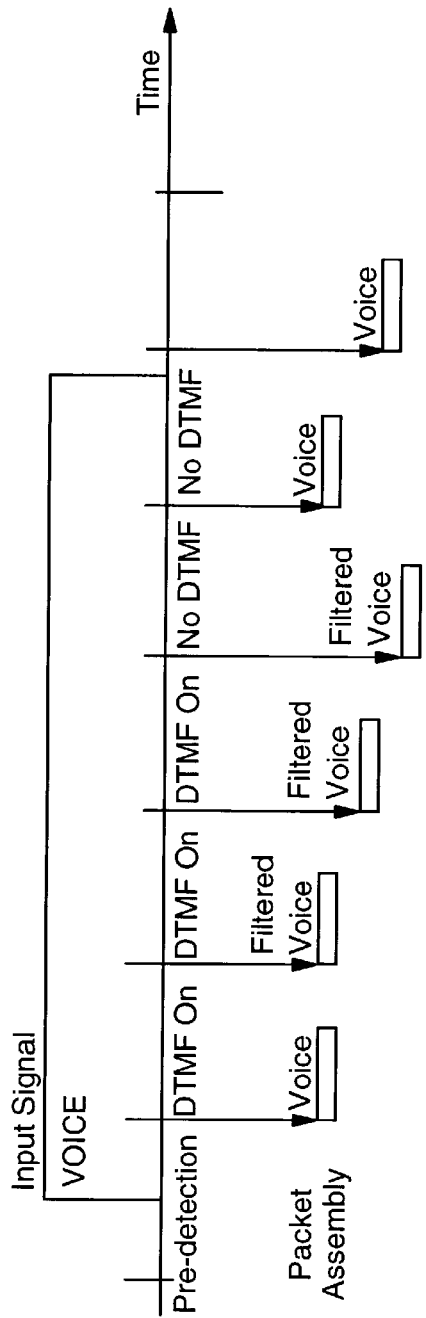

METHOD AND SYSTEM FOR TRANSMITTING A DTMF SIGNAL WITH COMPRESSED VOICE IN A PACKET SWITCHING NETWORK

TECHNICAL FIELD

The present invention relates to voice transmission in high speed packet switching networks and more particularly to a method and system for ensuring the integrity of a Dual-Tone MultiFrequency (DTMF) signal in a compressed voice connection.

BACKGROUND ART

The evolution of digital networks in the last past years caused a fundamental shift in the customer traffic profile. Now, high speed packet switching networks allow the customer to integrate data, voice and video information which is digitally encoded, chopped into small packets and transmitted through the network. The efficient transport of mixed traffic streams on very high speed lines imposes a set of requirements for new network architectures in term of performance and resource consumption. The requirements are summarized below:

One key requirement is that the nodes must provide total connectivity; that is, support for attachment of a user's devices, regardless of vendor or protocol, and support for an ability to communicate with any other device. Networks have to support any type of traffic including data, voice, video, fax, graphic or image. Nodes must be able to take advantage of all common carrier facilities and to be adaptable to a plurality of protocols. All needed conversions must be automatic and transparent to the end user.

Another key requirement of high speed packet switching networks is reduction of end-to-end delay in order to satisfy real time delivery constraints and to achieve the necessary high throughput for the transport of voice and video. Increases in link speeds have not been matched by proportionate increases in the processing speeds of communication nodes and a fundamental challenge for high speed networks is to minimize the packet processing time within each node. In order to minimize the processing time and to take full advantage of the high speed/low error rate technologies, most of the transport and control functions provided by the new high bandwidth network architectures are performed on an end-to-end basis.

Communication networks have at their disposal limited resources to ensure an efficient packets transmission. An important requirement is an efficient bandwidth management scheme to take full advantage of a high speed network. While transmission costs per byte continue to drop year after year, transmission costs are likely to continue to represent the major expense of operating future telecommunication networks as the demand for bandwidth increases driven by new applications and new technologies.

A major goal of almost every customer is to reduce transmission costs in its networks by minimizing required bandwidth. One solution is to use bandwidth management algorithms to adjust the bandwidth according to the quality of service requested. For voice transmission, bandwidth can be saved by using voice compression algorithms capable of reducing significantly the data rate in voice circuits without measurable loss of quality. There are various possible ways to reduce the data rate required in a voice circuit from the 64 kbps standard data rate. Many voice compression algorithms rely on the fact that a voice signal has considerable redundancy, so the characteristics of the next few samples can be predicted from the last few samples. One of the most common voice compression algorithms based on the prediction method is the GSM technique. The GSM voice compression algorithm has been defined as a standard for the European digital cellular telecommunications system by the European Telecommunications Standards Institute (recommendation I-ETS 300 036).

According to international standards, when voice is converted to digital form, the analog signal is sampled at the rate of 8000 times per second (one sample every 125 microseconds) and each sample is represented or coded in 8 bits. This gives a constant bit rate of 64 000 bits per second. The coding system is called "Pulse Code Modulation" (PCM). The basic concept of PCM is that each eight bit sample is simply a coded measure of the amplitude of signal at the moment of sampling. This process is improved upon by a system called "Companding" (Compression/Expansion) where the lower amplitude parts of the scale are coded with more precision that the peaks. In practice, PCM is always encoded generally this way but the details of the standard differ in specific countries. One system is called "Mu-law" and the other is called "A-law". The "Companding" process, defined in CCITT recommendation G.711, performs a conversion between the 8-bit A-law or Mu-law companded format and the 13-bit uniform format used in the GSM algorithm. The GSM algorithm takes a block or window of 160 samples in this 13-bit uniform PCM format and encodes it in a compressed data stream of 260 bits. Therefore, the average bit rate of this compressed data stream is 13 kbps compared to the initial bit rate of 64 kbps. In the receive node, the voice decoder performs inverse operations.

This coding scheme is well suited for pure voice traffic in high speed digital networks and efficiently reduces the bandwidth actually occupied. However, for voice connections, some control signals such as Dual-Tone MultiFrequency (DTMF) signals, which have different characteristics than voice traffic, may be transmitted over the network.

Dual-Tone MultiFrequency DTMF signals are used either during the call establishment, from the customer telephone set, for pushbutton signaling, or once the call established, for signal recognition in particular applications.

In both cases, DTMF signals are transmitted through the packet switching network using the voice transmission path. The DTMF code provides 16 distinct signals. the signalling is based on the simultaneous transmission of two frequencies each one belonging to a group of 4 frequencies. The signal frequencies are geometrically spaced and are not harmonically related. The CCITT recommendation Q.23 defines the characteristics of the DTMF signalling in term of frequencies (to generate a tone), as well as in term of tolerance.

When the voice traffic in a digital network is compressed using the GSM techniques briefly described above, the DTMF signals may be corrupted by the voice compression algorithm. After compression and decompression, the DTMF signals may not be recognizable by a DTMF Detector at the destination node of the network. Such a situation is often unacceptable to an end user. This problem of DTMF corruption does not occur with low compression rate speech algorithms because such algorithms are able to transmit DTMF signals without any deterioration. For example, Adaptive Differential PCM (ADPCM) reduces the data rate required in a voice circuit from the 64 kbps standard rate to 32 kbps without measurable loss of quality. In concept, the ADPCM algorithm encodes each sample as the difference between it and the last sample, rather that as an absolute value. Voice is real time traffic. Voice packets must be delivered to the receiver at a steady, uniform state and not in burst. No transit delay is permitted and a short response time is required to satisfy the CCITT recommendations. That means it is not possible to wait for receiving a complete DTMF signal before resending it towards the destination node. Otherwise: the receiver could detect the same DTMF signal more than once; and the voice signal received on the other side by the destination node during the DTMF regeneration process, could be lost.

For these reasons, early detection of candidate DTMF signal is essential for triggering the DTMF process as soon as possible. Early detection consists of analyzing a window of 160 samples to find a candidate for a DTMF signal at the beginning of a DTMF cycle. An obvious alternative would be to stop the compression process as soon as the candidate DTMF signal is detected, and to transmit it at 64 kbps standard rate (clear channel). This raises a problem when the connection has reserved bandwidth for compressed voice but not enough reserved capacity for transmitting data in clear channel.

As illustrated in FIGS. 7, 8a and 9a, European Patent Application 95480109.8 (IBM's reference FR 9 94 036) entitled "Method and System for Transmitting a DTMF signal with Compressed Voice in a Packet Switching Network" relates to a mechanism for ensuring the integrity of DTMF (Dual Tone Multifrequency) signals at the destination node of a high speed packet switching network after compression and decompression of the traffic on a voice connection. The mechanism includes, in the source node where the voice compression is performed, a DTMF Detector placed in parallel with a voice compression unit performing the compression algorithm. The DTMF Detector complies with the CCITT recommendation Q.24. When a DTMF signal is detected by the source node, only the features essential for reconstituting the DTMF signal, are transferred to the destination node. In the destination node where the voice decompression is performed, a DTMF generator is placed in parallel with a voice decompression unit performing the decompression algorithm. At reception of the DTMF features, the DTMF generator reconstitutes the DTMF signal without corruption. The DTMF generator complies with the CCITT recommendation Q.23.

More particularly, the subject application discloses a source node method including the steps of: receiving from a network incoming link an input signal comprising voice traffic and DTMF signals; detecting and validating the DTMF signals; coding the DTMF signals to be able to fully reconstitute them in the output node; building coded DTMF signal packets with the coded DTMF signals; detecting voice traffic; compressing voice traffic; building compressed voice packets; and transmitting the coded DTMF signal packets and the compressed voice packets to a destination node through the network.

On one hand, the step of detecting and validating the DTMF signal as described in prior art can be the cause of a high number of erroneous DTMF detections because a window of 160 samples (20 ms) is generally not large enough to be sure that the signal which has been detected and identified as a DTMF signal is really a DTMF signal and not a voice signal with similar features. On another hand, it is not possible to stop the voice compression process and to wait to be sure that the pre-detected DTMF is a true DTMF signal.

SUMMARY OF THE INVENTION

The present invention discloses a system and a method for transmitting DTMF signals over high speed digital networks using voice compression algorithms, and particularly to a method for ensuring the integrity of DTMF signals at the destination node of a network after compression and decompression of data on a voice connection. At the source node, where the voice compression is performed, a DTMF Detector is placed in parallel with a voice compression unit performing the compression algorithm. The DTMF Detector complies with the CCITT recommendation Q.24. When the presence of a DTMF signal is assumed during a predetermined period of time, a frequency among the identified DTMF frequencies is removed from the assumed DTMF signal to avoid any double DTMF detection at end user equipment. In a preferred embodiment, the removed frequency belongs to the high group frequencies. When the DTMF signal is finally validated by the source node, only features essential for reconstituting the DTMF signal are assembled in packets and transferred to the destination node.

BRIEF DESCRIPTION OF THE DRAWINGS

While the specification concludes with claims particularly pointing out and distinctly claiming that which is regarded as the present invention, details of a preferred embodiment of the invention may be more readily ascertained from the following detailed description, when read in conjunction with the accompanying drawings wherein:

FIG. 4 depicts a packet structure containing a coded DTMF signal according to the present invention;

FIG. 8a shows a prior art method of identifying candidate DTMF signal and transmitting candidate DTMF packets;

FIG. 8b show a method of identifying candidate DTMF signal and transmitting candidate DTMF packets in accordance with the present invention;

DESCRIPTION OF THE PREFERRED EMBODIMENT

Figure 1:
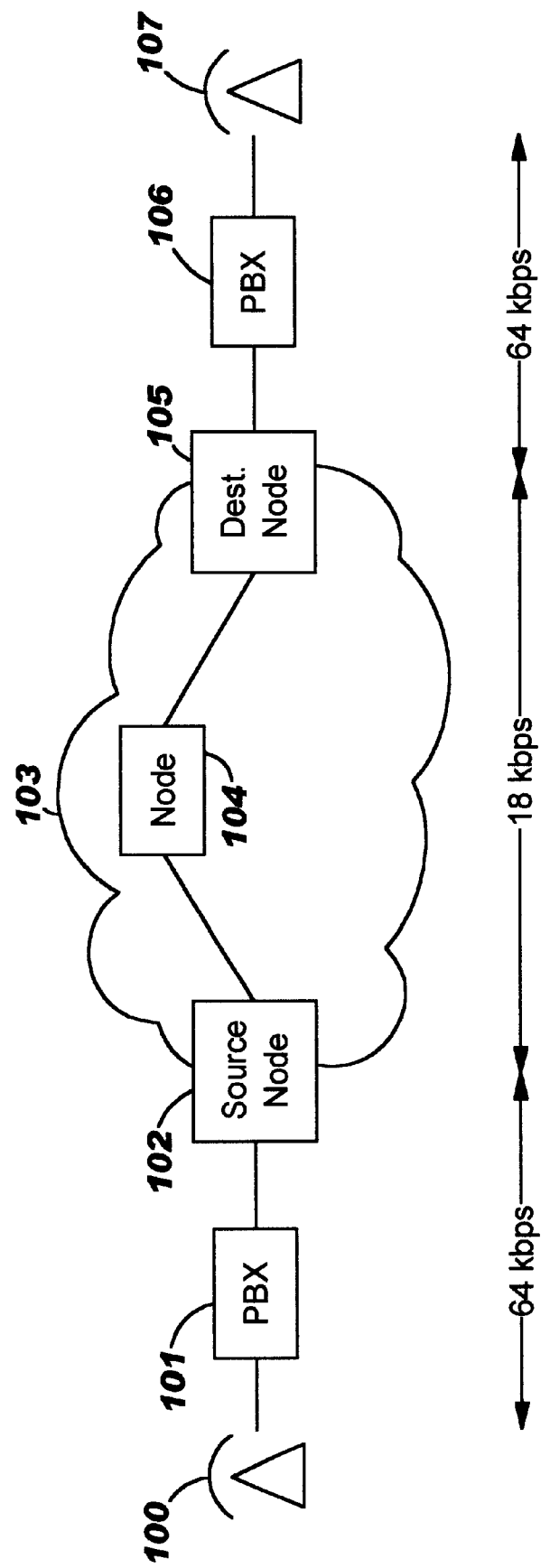
FIG. 1 shows a general view of a voice connection over a high speed packet switching network according to the present invention.

FIG. 1 shows a typical model of a voice connection over a high speed packet switching network. A telephone set (100) is linked via a subscriber line to a PBX (Private Branch office Exchange) (101). This PBX is connected to a source node (102), via a digital trunk (for example, an E1 or T1 trunk, respectively at 2,048 Mbps and 1,544 Mbps). The source node (102) communicates via multiple transit nodes (104) to a destination node (105). The connection between the destination node (105) and the source node (102) is achieved by means of network management functions, or is realized dynamically by analyzing the dialed number. On the other side of the network, the destination node (105) is linked to a remote PBX (106), which connects the call to the corresponding telephone set (107). The digital link between the PBX and the destination node may be, for example, a E1 or T1 trunk, at 64 kbps per voice channel. Inside the network (103), voice channels compressed with the GSM technique only require a bandwidth of 13 kbps each.

Figure 2:
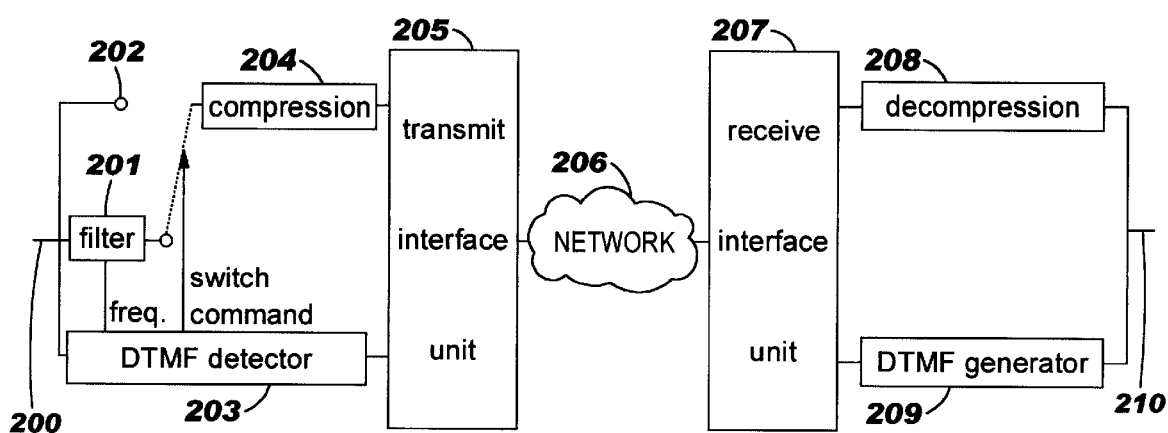
FIG. 2 shows the general structure of the input and destination nodes of the high speed digital network supporting the voice connection according to the present invention.

FIG. 2 illustrates processes carried out in the source (102) and destination (105) nodes for detecting, transmitting and reconstituting a DTMF signal according to the present invention. A signal coming from a 64 kbps channel (200) includes voice traffic and DTMF signals. This incoming signal is presented in parallel to: a DTMF detector (203) for detecting candidate DTMF signal and validating DTMF signals, a filter (201) for removing a frequency among the pre-detected DTMF frequencies so that any double DTMF detection can be avoided at end user equipment, a voice compression system (204) for compressing filtered voice traffic (201) or pure voice traffic (202) depending on whether a candidate DTMF signal is detected. After compression the traffic is assembled in packets (205) and transmitted to the destination node (105).

Before determining whether the candidate DTMF signal is a true DTMF signal or voice traffic, the candidate DTMF signal at the output of the DTMF detector is filtered (201) to remove the value of the second group frequency. The filtered candidate DTMF signal is then compressed (201, 204), assembled in packets (205) and sent to the destination node (105).

After the DTMF Detector (203) has determined that the candidate DTMF signal is a true DTMF signal and not voice traffic, all the features essential for reconstructing the DTMF signal at the destination, are forwarded to a Transmit Interface (205). The Transmit Interface (205) handles the compressed voice traffic (204) and the output of the DTMF Detector (203). Depending on whether the signal on the channel is voice (filtered or not) or a true DTMF signal, different packets are assembled and sent on the network (103) towards the destination node (105).

On the other side of the network, incoming packets are received and processed in a Receive Interface (207). Depending on the type of information contained in the packets (voice or DTMF), the Receive Interface (207) sends the packets either to a voice decompression system (208) or to a DTMF generator (209). The corresponding signal (voice or DTMF) is then sent to the end user via an outgoing voice channel (210).

Figure 7:
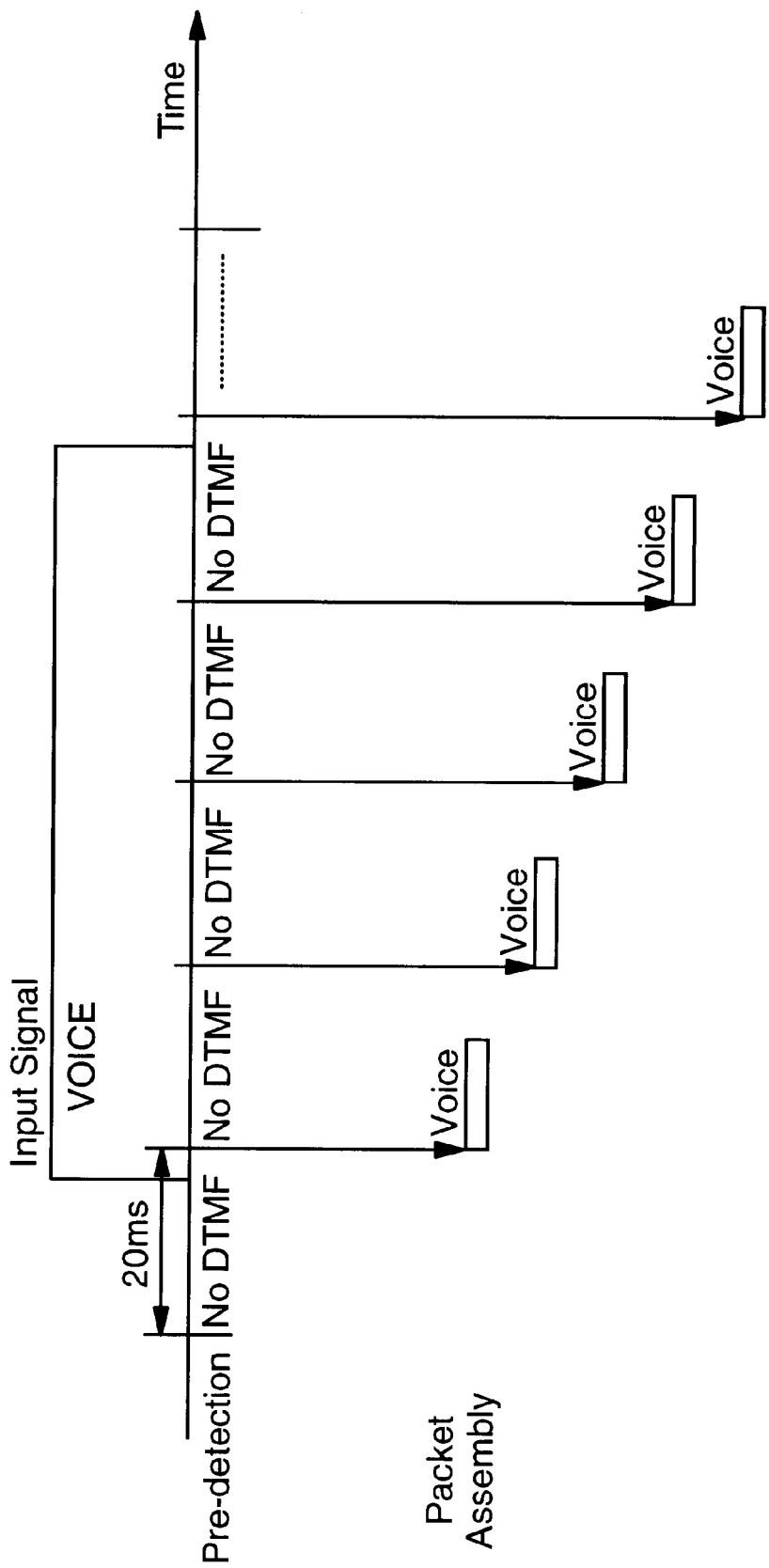
FIG. 7 shows a method of detecting voice and transmitting compressed voice packets known in the prior art.
Figure 9A:
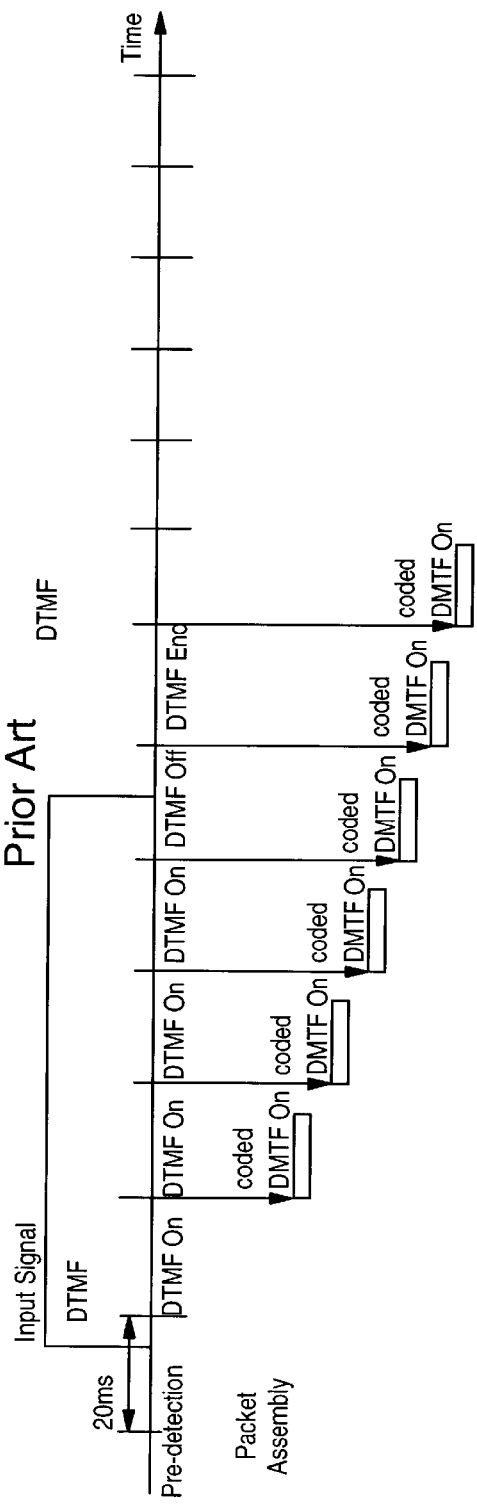
FIG. 9a shows a prior art method of detecting candidate DTMF signal, for validating the candidates and for transmitting coded DTMF signal packets.
Figure 9B:
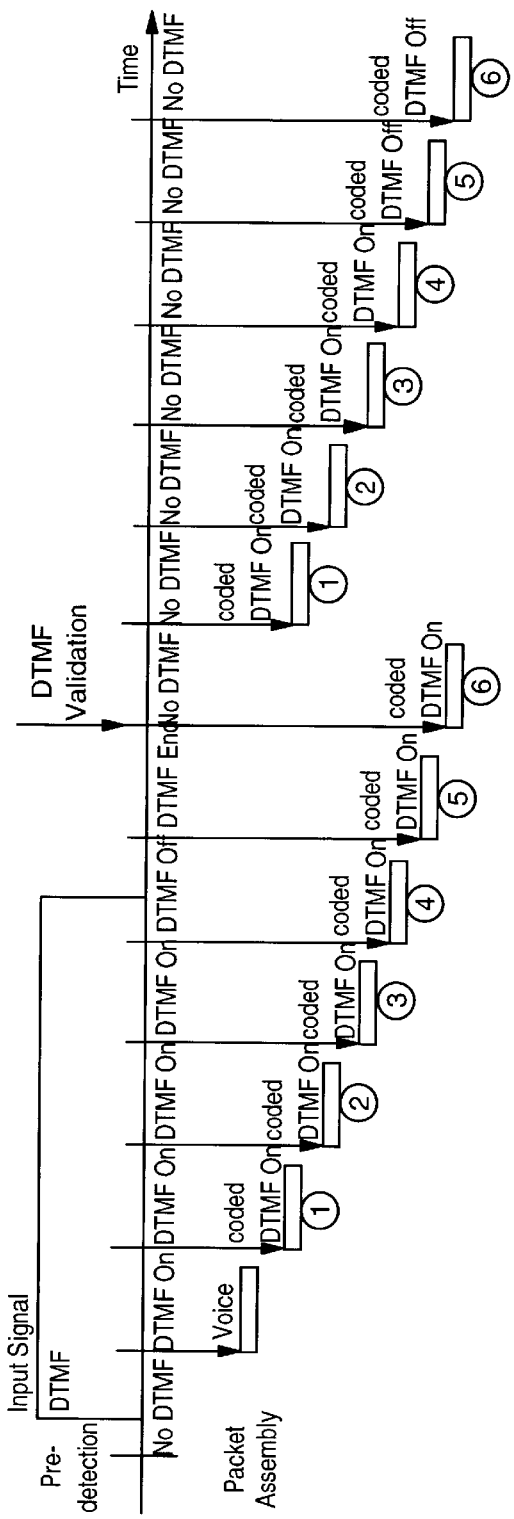
FIG. 9b shows a method of detecting candidate DTMF signal, for validating the candidates and for transmitting coded DTMF signal packets in accordance with the present invention.

FIG. 7 shows the method of detecting, compressing, assembling voice when no DTMF signal is pre-detected. FIG. 8b shows the inventive method of detecting candidate DTMF signals and filtering, compressing, assembling, transmitting such candidate DTMF signals. FIG. 9b shows the inventive method of pre-detecting, validating, buffering, coding, assembling and transmitting DTMF signals.

Figure 3:
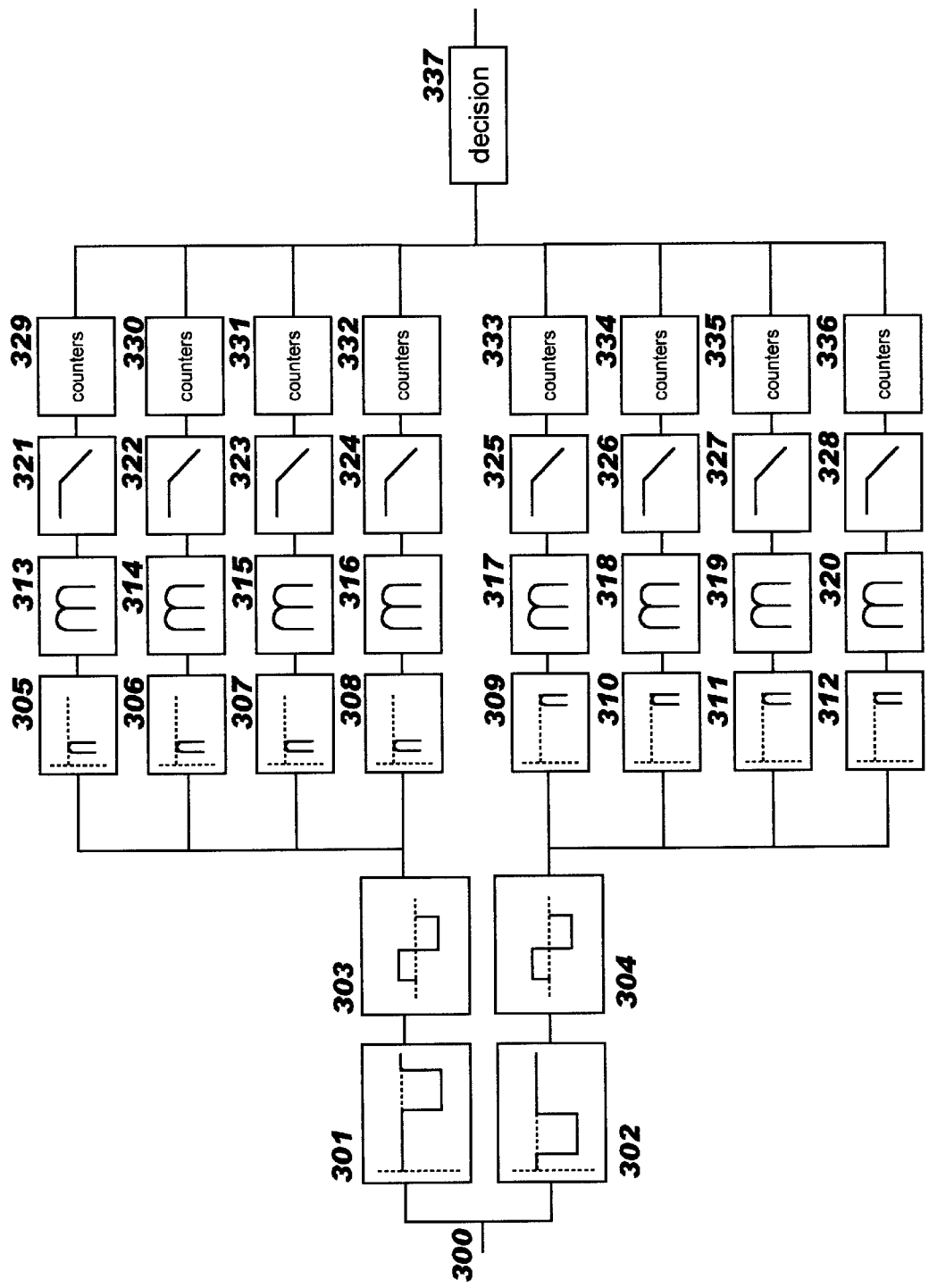
FIG. 3 illustrates in detail the internal functioning of a DTMF Detector within a source node according to the present invention.

FIG. 3 describes in detail the internal functioning of the DTMF Detector (203) within the source node (102). DTMF signals enable pushbutton signalling from a customer telephone set using the voice transmission path. DTMF coding defines 16 distinct symbols. Table 1 shows the matrix of frequencies used to encode the 16 DTMF symbols. Each symbol is represented by the sum of the two frequencies. The row frequencies are in a low frequency band, below 1 kHz, and the column frequencies are in a high frequency band, between 1 kHz and 2 kHz. The digits are displayed as they appear on a telephone's 4×4 matrix keypad (on standard telephone sets, the fourth column is omitted). The frequencies are geometrically spaced and are not harmonically related.

| | | HIGH GROUP FREQUENCIES (Hz) | | | |
|---|---|---|---|---|---|
| | | 1209 | 1336 | 1477 | 1633 |
| LOW | 697 | 1 | 2 | 3 | A |
| GROUP | 770 | 4 | 5 | 6 | B |
| FREQUEN- | 852 | 7 | 8 | 9 | C |
| CIES (Hz) | 941 | * | 0 | # | D |

A valid DTMF signal comprises a ON period (when signal components at two frequencies are present), followed by a silence period (also called interdigit period, or OFF period). In the following, a frequency belonging to the low group will be called first frequency. In the same way, a frequency belonging to the high group will be called second frequency. The requirements of a DTMF Detector according to the Q.24 recommendation are described below:

Each signal consists of components at each of two frequencies as specified in recommendation Q.23. In the following description, references to detecting "frequencies" or "energy levels" shall be construed as referring to signal components at those frequencies or having those energy levels. The Detector shall provide a check for the simultaneous presence of one and only one frequency from the high group and one and only one frequency from the low group.

DTMF Detectors are designed to detect frequencies with a tolerance of 1.8% of their nominal value. Some country telephony administrations add a non-operation range on frequency tolerance. This last requirement is necessary to inhibit the Detector from falsely detecting speech and other signals as valid DTMF digits.

The DTMF Detector must detect DTMF signals in a predefined range of energy levels. A non- operation level, below which a DTMF signal must not be detected, is also defined. These two ranges of levels are country dependent.

The DTMF Detector must be able to detect DTMF signals when the two frequencies are received at different power levels. The second frequency may be received at a power lower level than the first frequency because of the attenuation characteristics of the telephone network. This level difference is called twist, and the situation described above is called normal twist. Reverse twist occurs when the first frequency is received at a lower power level than the second frequency. The operation range for normal and reverse twist is country dependent.

The DTMF Detector should recognize signals whose duration exceeds the minimum expected value. To guard against false signal indication, the Detector should not respond to signals whose duration is less than a specified value. Similarly, pause intervals greater than a specified minimum value should be recognized by the Detector. To minimize erroneous double-registration of a signal if reception is interrupted by a short break in transmission, or by a noise pulse, interruptions shorter than a specified value must not be recognized. The maximum rate at which signals can be received (signalling velocity) may be related to the above values. All these maximum and minimum values are country dependent.

The Detector must operate in the presence of speech without incorrectly identifying the speech signal as a valid DTMF signal. This is called talk-off performance.

The invention described in this patent is based on a classical DTMF Detector. A detailed description of the DTMF Detector is needed to better understand the modifications made to pre-detect the DTMF signal. In particular, the pre-detection process is based on: the number of samples which compose the ON period of a DTMF signal; and the number of samples which compose the OFF period of a DTMF signal.

The DTMF Detector (203) in the source node described in FIG. 3 is divided in three parts:

a) One for the processing of the low group frequencies range.

b) Another for the processing of the high group frequencies range. Each branch consists in a band stop filter followed by a limiter. The output of the limiter is used as input for 4 identical sub-branches, since there are 4 possible frequencies in a given group. Each of these 4 sub-branches is tuned on one of these 4 possible frequencies.

c) The last part (337) detects whether a DTMF signal is present in the digital input signal.

The digital input signal (300) is applied to 2 band stop filters. The first band stop filter (301) rejects signals in the frequency range of the high group of frequencies. The second filter (302) rejects signals in the frequency range of the low group of frequencies. The energy is computed on the output of each band stop filter.

The output of each band stop filter, is used as input for 2 limiters (303 and 304). At this point, the energy level of the signal is lost and only the frequency remains unchanged. For this reason, the signal energy levels are computed directly before applying the signals to the limiters..

These limiters allow use of the same thresholds (which will be defined later in the low pass filter description) to handle the output signal from the stop band filters independent of what the input level might have been.

There are 8 identical sub-branches, each tuned to one of the eight possible frequencies used in generating DTMF signals. Each sub-branch consists of a narrow band pass filter (305, 306, 307, 308, 309, 310, 311, 312), followed by a wave rectifier (313, 314, 315, 316, 317, 318, 319, 320), itself followed by a low pass filter (321, 322, 323, 324, 325, 326, 327, 328) and an associated counter subsystem (329, 330, 331, 332, 333, 334, 335, 336).

Each narrow band pass filter has two main characteristics: a maximum amplification at 0 dB for one of the frequencies defined in recommendation Q.23, and an attenuation at 3 dB for the limits of the operation range of the frequency tolerance defined by the country specification.

The wave rectifier applies an absolute value function to the output of the narrow band pass filter. This operation creates a DC component and harmonics. The function of the low pass filter following the wave rectifier is to reject the harmonics, resulting in a signal depending directly on the DC component. Two thresholds are employed at the output of the low pass filter. The first is called a "Raising Threshold" (RT) and is used to identify valid DTMF samples. These samples have a value greater than the value of RT. The RT value is defined to be: below the value reached by the output of the low pass filter when the frequency is within the operation range taking into account the frequency tolerance; but above the value reached by the output of the low pass filter when the frequency is within the non-operation range taking into account the frequency tolerance.

The second threshold is called "Falling Threshold" (FT) and is used to identify samples of the interdigit signal. These samples have a value lower than the value of FT. The FT value is defined as the output of the low pass filter when only background noise is present in input (300).

Each sub-branch includes two types of counters: 20 ms counters and counters accumulating the result of the previous counters. There are four counters per sub-branch:

a) a BCRT counter for the samples which are above the Raising Threshold RT. This counter contains the number of samples at one of the frequency of the DTMF signal;

b) a CCRT counter which is the clamped accumulation of the successive BCRT counters;

c) a BCFT counter for the samples which are below the Falling Threshold FT. This counter contains the number of samples which compose the interdigit signal in the sub-branch; and d) a CCFT counter which is the clamped accumulation of the successive BCFT counters.

BCRT and BCFT counters are used for respectively updating CCRT and CCFT. They are also used in the detection of candidate DTMF signals. The CCRT and CCFT counters are clamped to avoid overflow. CCRT is used to verify that the ON period of the DTMF signal is long enough to satisfy the relevant country specification. If the CCRT value is greater than the allowed minimum ON time interval, then the ON period validation flag is raised. The candidate detection process uses a minimum ON time interval equal to 20 ms, to detect the DTMF signal as soon as possible. In the same way, CCFT is used to verify that the OFF period is long enough to satisfy the country specification. If the CCFT value is greater than the minimum OFF time interval, then the OFF period validation flag is raised. A OFF period validation flag can be raised only if its associated ON period validation flag is raised. When no signal is detected (neither ON nor OFF flag is raised), a NOTHING flag is raised.

The final decision (337) requires verification of certain signal properties before deciding whether the digital input signal can be considered to be a valid DTMF signal. These verifications are divided in two types: a) the verification explicitly performed during the decision process taking into account energy level of the frequencies, twist, one and only one frequency per group; etc.; and b) the verification implicitly done by the DTMF Detector during other processes: frequency variation, timing, etc.

Explicit Verification

The first verification operation is to verify that each energy level computed after band stop filtering is within a valid range of energy levels according to the relevant country standard. If the energy level of signals at both of the frequencies in the suspected DTMF signal is within the valid range, the verification are continued. If the energy level at either or both of the frequencies are not within the applicable valid ranges, the digital input signal is not considered as being a DTMF signal. No further verification operations are performed.

The second operation is twist verification. The energy of the two signals resulting following stop band filtering are evaluated: Determine which signal has the higher energy level. A twist threshold level is established by subtracting 12 dB from the higher energy level. The lower of the two energy levels is compared to the twist threshold level. If the lower energy level is greater than the twist threshold level, the twist is valid and verification operations continue. If the lower energy level is less than the twist threshold level, the twist is not valid and the verification operations are stopped. The digital input signal is discarded as a DTMF candidate.

Finally a check is made to confirm that only one ON period validation flag and one OFF period validation flag are set in each group.

Implicit Verification

Frequency verification is implicitly performed by the low pass filter and the BCRT and CCRT counters If a detected frequency is in the operation range (defined by the country specifications), then the output of the low pass filter is above the RT value, and some samples values are above the RT value. If the frequency is out of the operation range, then the output of the low pass filter is below the RT value, and no sample has a value greater than RT value. The BCRT counter remains equal to 0, which means there is no valid frequency in this sub-branch.

Timing verification is performed after updating the counters CCRT and CCFT and during the setting of the ON and OFF period validation flags.

If the conditions discussed above are, the candidate DTMF signal is considered valid, and the END flag is raised. Three flags (ON, OFF, or NOTHING) are used as input to the transmit interface to be described below. The DTMF Detector Exit Status is then updated, and the DTMF key is computed as described in the following.

The DTMF Detector (203) provides the Transmit Interface (205) with the following information:
  a) DTMF Detector Exit Status (DTMF or NO_DTMF)—This variable identifies whether the DTMF Detector (203) has detected a valid DTMF signal and consequently whether all other DTMF Detector (203) outputs are valid or not.
  b) DTMF Key—This variable identifies the couple of frequencies within the pre-detected DTMF signal.
  c) DTMF type—This variable identifies the period of the DTMF signal. The possible values for the DTMF type may be:
    1) TONE_ON—This value is used to indicate that a complete 20 ms window of DTMF signal on period has been detected.
    2) TONE_OFF—This value is used to indicate that a complete 20 ms window of DTMF signal off period has been detected after at least two windows of DTMF signal on period. The final validation of the DTMF occurs after two consecutive windows of DTMF signal off period.
    3) TONE_END—This value is used to indicate that a DTMF signals is confirmed. That means that after a TONE_ON a DTMF off signal is detected during at least 35 ms.
  4) DTMF energies—This variable identifies the energy of each of both frequencies within the DTMF signal detected.
  5) DTMF counters—The four CCRT counters associated with the four high frequencies verify that the ON period of the DTMF signal is long enough compared to the country specifications.

Figure 10:
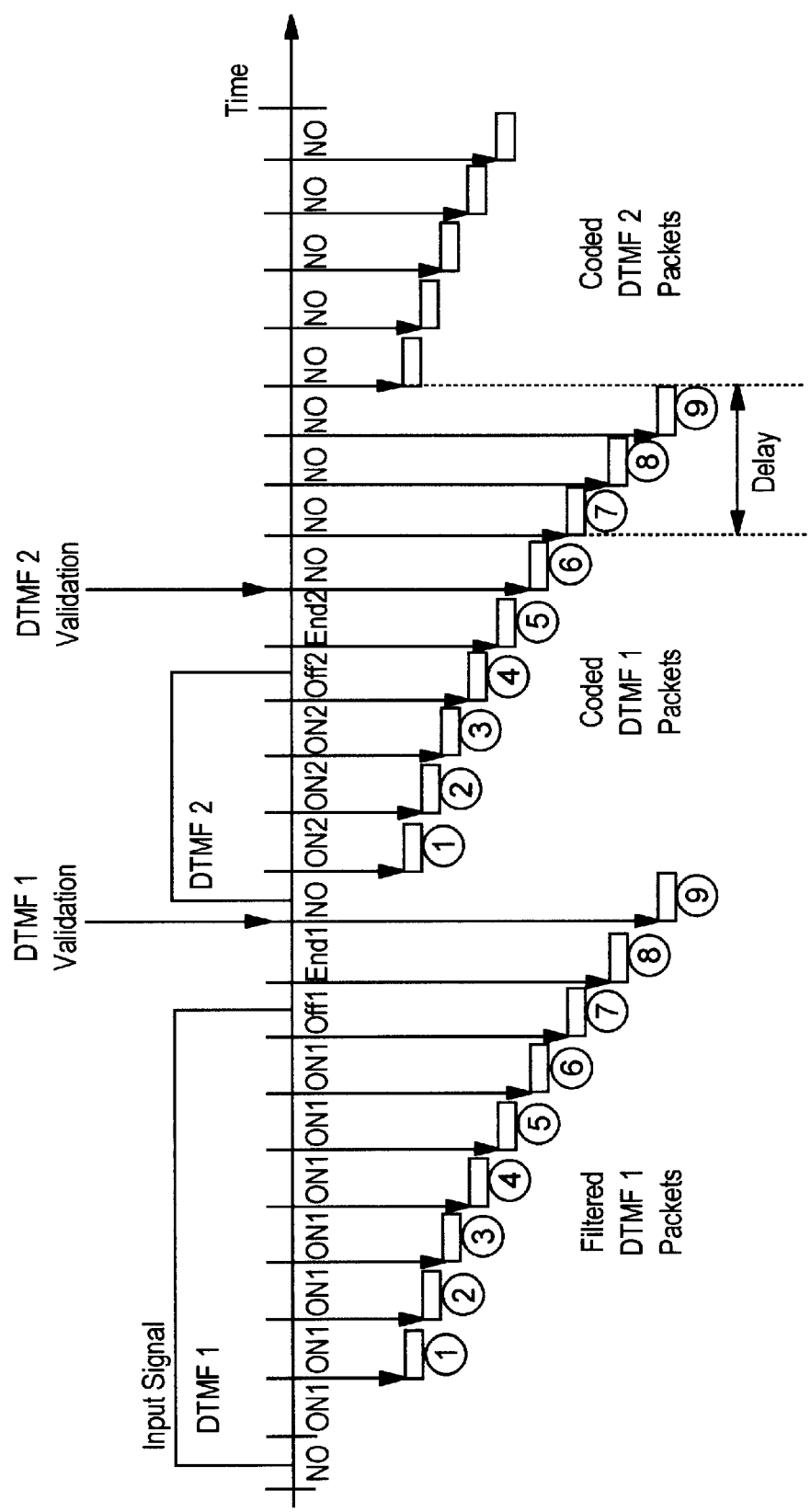
FIG. 10 shows a method of pre-detecting, validating, coding and transmitting consecutive DTMF signals according to the present invention.
Figure 11:
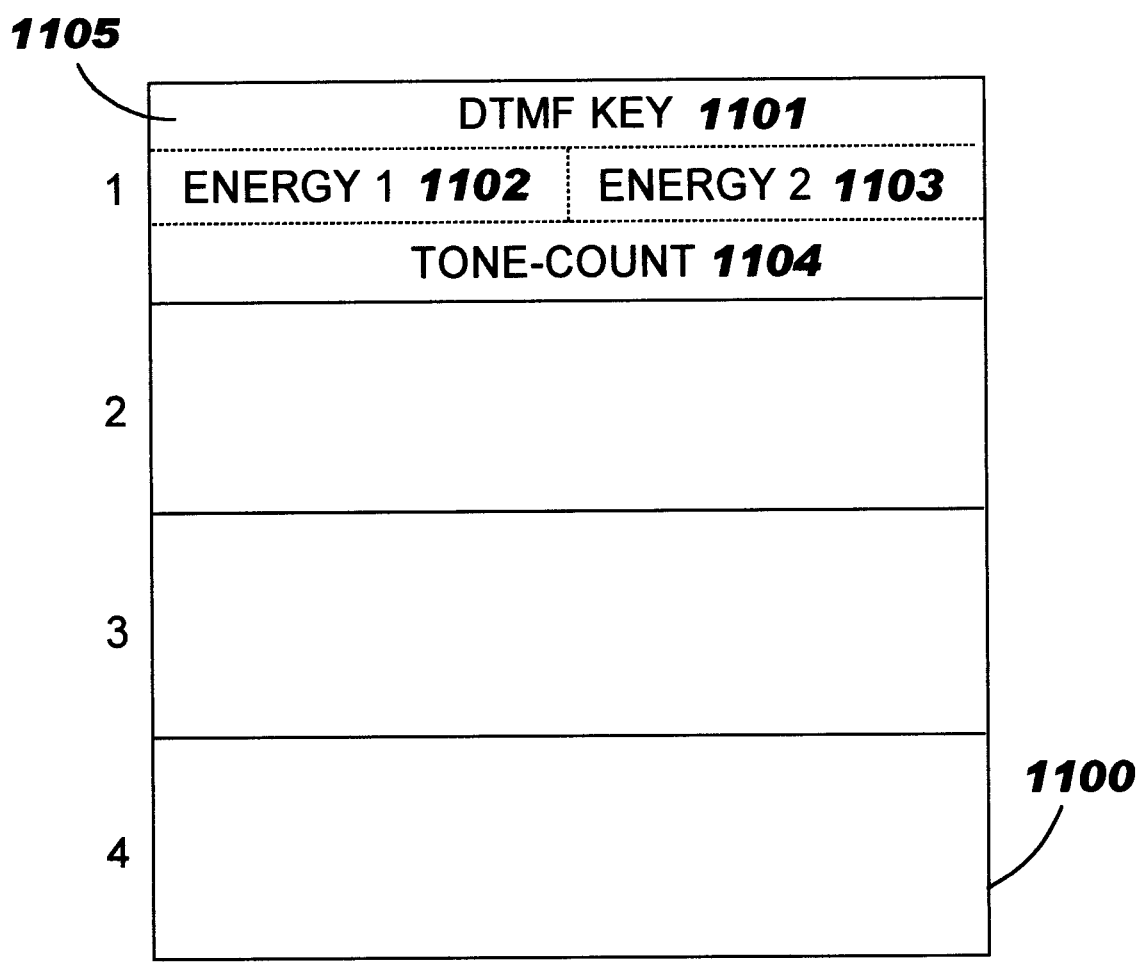
FIG. 11 shows a cyclic buffer structure according to the present invention.

As shown in FIG. 10, during validation, coding, assembling and transmission of a DTMF signal (DTMF 1) at the source node, another DTMF (DTMF 2) signal may occur and must be processed by the DTMF Detector (203). Thus, the transmission of the current DTMF signal (DTMF 2) is delayed as long as the transmission of the previous one (DTMF 1) is not yet completed. The information relative to the current DTMF (DTMF 2) signal is temporally stored in a buffer—preferably a cyclic buffer. This cyclic buffer (1100), as illustrated in FIG. 11, collects the DTMF essential features required to reconstruct valid DTMF signals in the destination node, in particular: the DTMF key (1101), the energy of the first frequency (1102), the energy of the second frequency (1103), the number of TONE_ON and TONE_OFF periods (TONE_COUNT—1104).

The cyclic buffer includes an entry (1105) for each DTMF signal so that it is possible to process consecutive DTMF signals. The buffering process is characterised in that it comprises the following steps:
  a) as soon as a DTMF signal is pre-detected, the DTMF essential features—DTMF key (1101), DTMF energies (1102, 1103)—are stored in a temporary buffer;
  b) each time a DTMF signal is pre-detected, the TONE_COUNT field of the temporary buffer is incremented by one;
  c) once the DTMF signal is validated, the contents of the temporary buffer are stored in the first available place within the cyclic buffer (1100). If the candidate DTMF is not validated, the contents of the temporary buffer are erased;
  d) incrementing the TONE_COUNT field by two (a DTMF signal must be followed by at least two windows of DTMF signal off period (TONE_OFF)); and
  e) scanning said cyclic buffer (1100).

As long as the value of the TONE_COUNT field (1104) is greater than zero, a pre-detected DTMF signal is coded and assembled in a packet. Then, the TONE_COUNT value (1104) is decremented by one. The transmission of coded pre-detected DTMF signals goes on until the TONE_COUNT value reaches the value zero. As long as the TONE_COUNT value (1104) is greater than two, the DTMF type field (403) is set to TONE_ON, otherwise the DTMF type is set to TONE_OFF. As soon as the TONE_COUNT value (1104) is equal to zero, the place in the cyclic buffer (1100) allocated to that DTMF signal is released and can be used again for another DTMF signal.

Filtering

Figure 5:
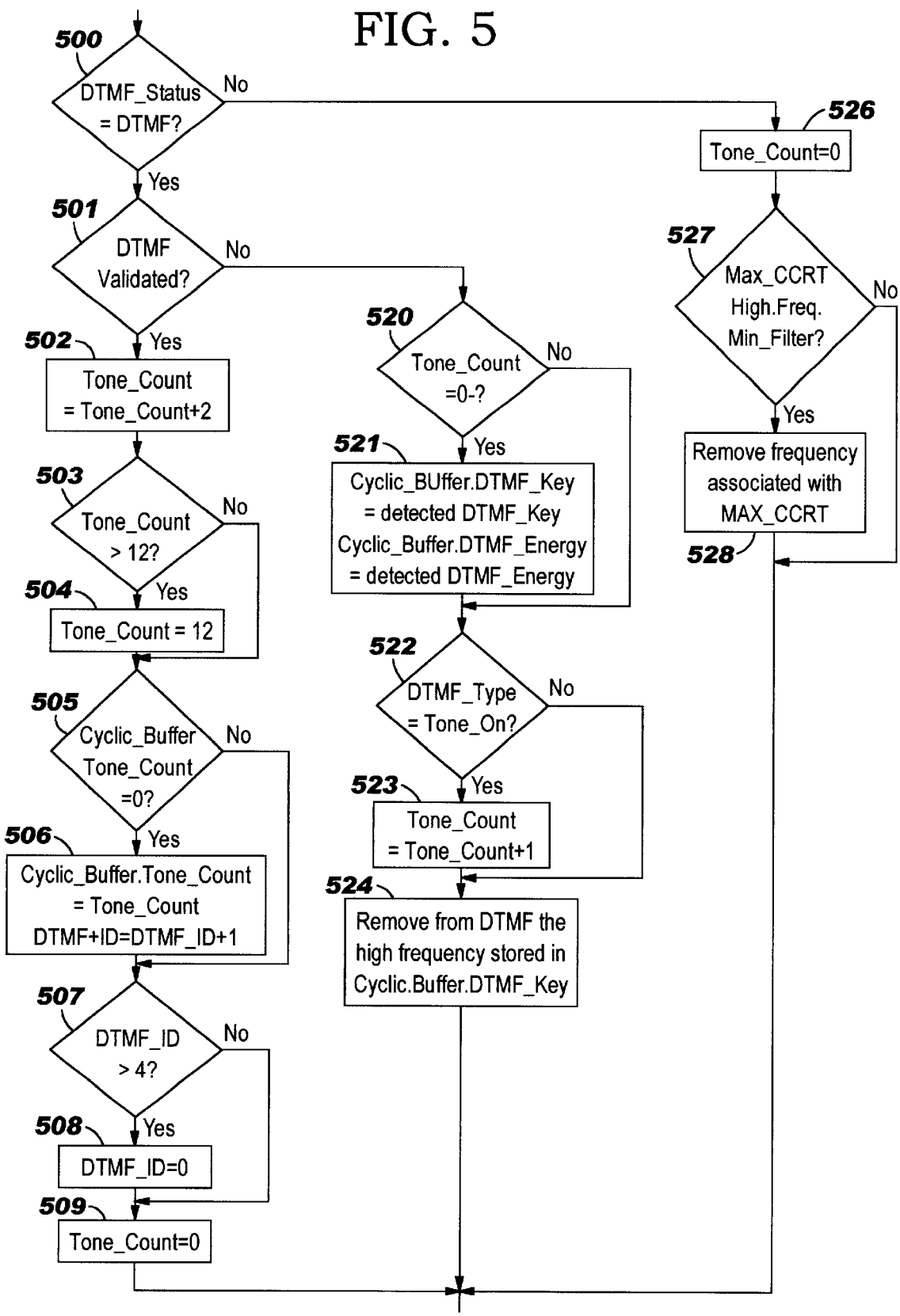
FIG. 5 illustrates a buffering and filtering process according to the present invention.

Before determining whether candidate DTMF signals are true DTMF signals or voice traffic, to avoid any double DTMF detection at end user equipment, candidate DTMF signals are filtered (201) to remove the signal component one of the candidate DTMF frequencies. The filtered candidate DTMF signals are then compressed ((204), assembled in packets (205) and sent to the destination node (105). In a preferred embodiment, to limit the alteration of the voice traffic, the filtered frequency is chosen in the high group frequencies. The buffering and filtering process as illustrated in FIG. 5 can be expressed in the following pseudo-code language:
  (500) if DTMF_DETECTOR_EXIT_STATUS=DTMF then
  (501) if DTMF validated then */DTMF is a true DTMF */temp.buffer initialization
  (502) TONE_COUNT=TONE_COUNT+2 */addition of 2 TONE_OFF (503) if TONE_COUNT<12 then */DTMF length limited to
(504) TONE_COUNT=12 */12 windows
end if
(505) if CYCLIC_BUFFER (DTMF_ID).TONE_COUNT=0 then
*/copy of temporary buffer
*/into cyclic buffer
(506) CYCLIC_BUFFER(DTMF_ID).TONE_COUNT=TONE_COUNT
DTMF_ID=DTMF_ID+1 */next entry in cyclic buffer
(507) if DTMF_ID< or =DTMF_NB then
(508) DTMF_ID=0 */cyclic buffer management
end if
(509) TONE_COUNT=0
end if
end if
(501) if pre-detected DTMF still not validated then
(520) if TONE_COUNT=0 then */cyclic buffer initialisation
(521) CYCLIC_BUFFER (DTMF ID).DTMF_KEY= detected DTMF_KEY
(522) CYCLIC BUFFER (DTMF_ID).DTMF_ENERGY=detected DTMF ENERGY
end if
(523) if DTMF_TYPE=TONE_ON then
(524) TONE_COUNT=TONE_COUNT+1/* TONE_COUNT temp.buff incrementation
end if
(525) Remove from the pre-detected DTMF the high frequency stored
in CYCLIC_BUFFER (DTMF_ID).DTMF—KEY
end if
end if
(500) if DTMF_DETECTOR_EXIT_STATUS=NO_DTMF then
*/no pre-detected DTMF
(526) TONE_COUNT=0 *no DTMF storage
(527) if MAX_CCRT high frequency<MIN_FILTER then
(528) Remove from input signal the frequency associated with MAX_CCRT
end if
end if In a preferred embodiment, the length of the DTMF signal is limited to 12 windows (12×20 ms), the DTMF_ID variable identifies the cyclic buffer entry, the DTMF_NB constant represents the number of entries in the cyclic buffer (this constant is preferably equal to 4. The cyclic buffer comprises one entry per DTMF, thus four DTMFs can be processed consecutively), the MAX_CCRT variable represents the highest CCRT value, and the MIN_FILTER constant represents the minimum number of samples where the filtered output energy is above the Raising Threshold (RT). In the preferred embodiment, this constant is equal to 60.

Transmit Interface

The Transmit Interface (205) is responsible for building packets containing coded DTMF signals or compressed voice and transmitting those packets to the destination node.

Packet Assembly and Transmission

Every 20 ms window, the Transmit Interface (205) decides either to build a coded DTMF signal packet and to send it over the network (206), or to send compressed (204) traffic (202)—including filtered voice traffic (201) or filtered DTMF signal—formatted in packets.

Figure 6:
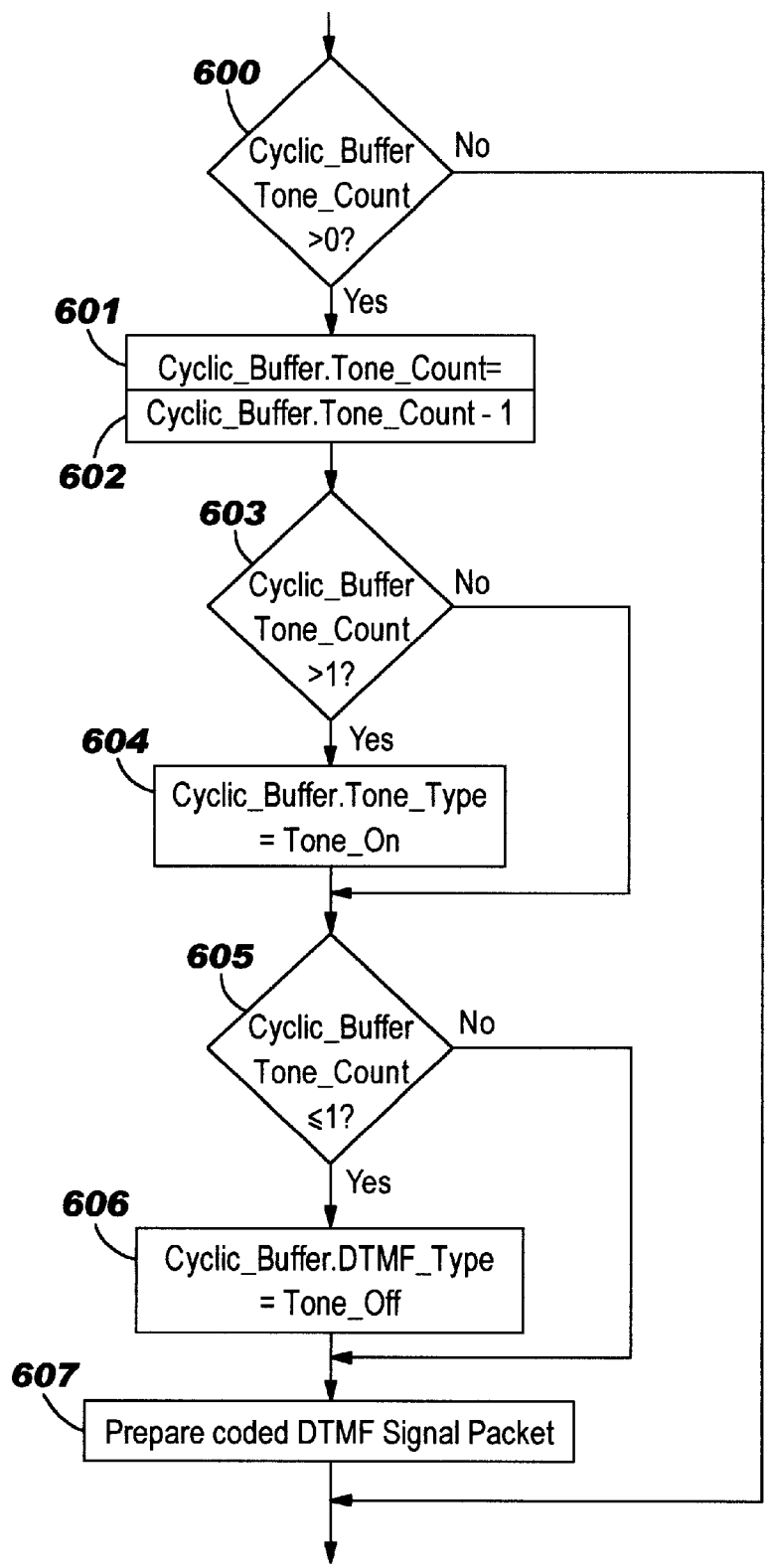
FIG. 6 is the data flow diagram of a transmission process according to the present invention.

Here is a description expressed in pseudo code of the coded DTMF signals transmission process as illustrated in FIG. 6.

(600) if CYCLIC_BUFFER (DTMF_ID).TONE_COUNT>0 then
(601) CYCLIC_BUFFER (DTMF_ID).TONE_COUNT=
(602) CYCLIC_BUFFER (DTMF_ID).TONE_COUNT-1
(603) if CYCLIC_BUFFER (DTMF_ID).TONE_COUNT>1 then
(604) CYCLIC_BUFFER(DTMF_ID).DTMF_TYPE= TONE_ON
end if
(605) if CYCLIC_BUFFER(DTMF_ID).TONE_COUNT=1 or <1 then
(606) CYCLIC_BUFFER(DTMF_ID).DTMF_TYPE= TONE_OFF
end if
(607) Prepare DTMF packet (DTMF_KEY, DTMF_TYPE, DTMF_ENERGIES)
end if DTMF Packet Structure The packet structure of the coded DTMF signal is shown in FIG. 4. The packet includes the following fields:

(401) Packet id—specific identification of the data packet for differentiating coded DTMF signal packets with compressed voice packets;
(402) Key—Contains the DTMF Key;
(403) Type—Contains the DTMF Type.
(404) Energy 1—Contains the energy level of the first frequency.
(405) Energy 2—Contains the energy of the second frequency.

Receive Interface

The Receive Interface Unit (207) is responsible for receiving and analysing the incoming data packets and for subsequently activating the DTMF Generator (209) or the Decompression Unit (208).

Events associated with the Receive Interface process are:
COMPRESSED_VOICE—The received packet is a compressed voice Packet;
DTMF_TONE_ON—The received packet is a coded DTMF signal packet with
TONE_ON type set; and
DTMF_TONE_OFF—The received packet is a coded DTMF signal packet with
TONE_OFF type set.

The method in the destination node (105) for receiving compressed voice traffic comprises the steps of:
receiving, identifying and differentiating (203) packets, said incoming packets comprising
coded DTMF signals (400) and compressed voice;
decoding (208) the incoming coded DTMF signal packets (400);
reconstructing (208) the DTMF signals;
decompressing (207) voice traffic and filtered voice traffic from said incoming compressed voice packets; and transmitting on a network outgoing link (209) said reconstructed DTMF signals, said decompressed voice traffic and said decompressed filtered voice traffic.

Figure 12:
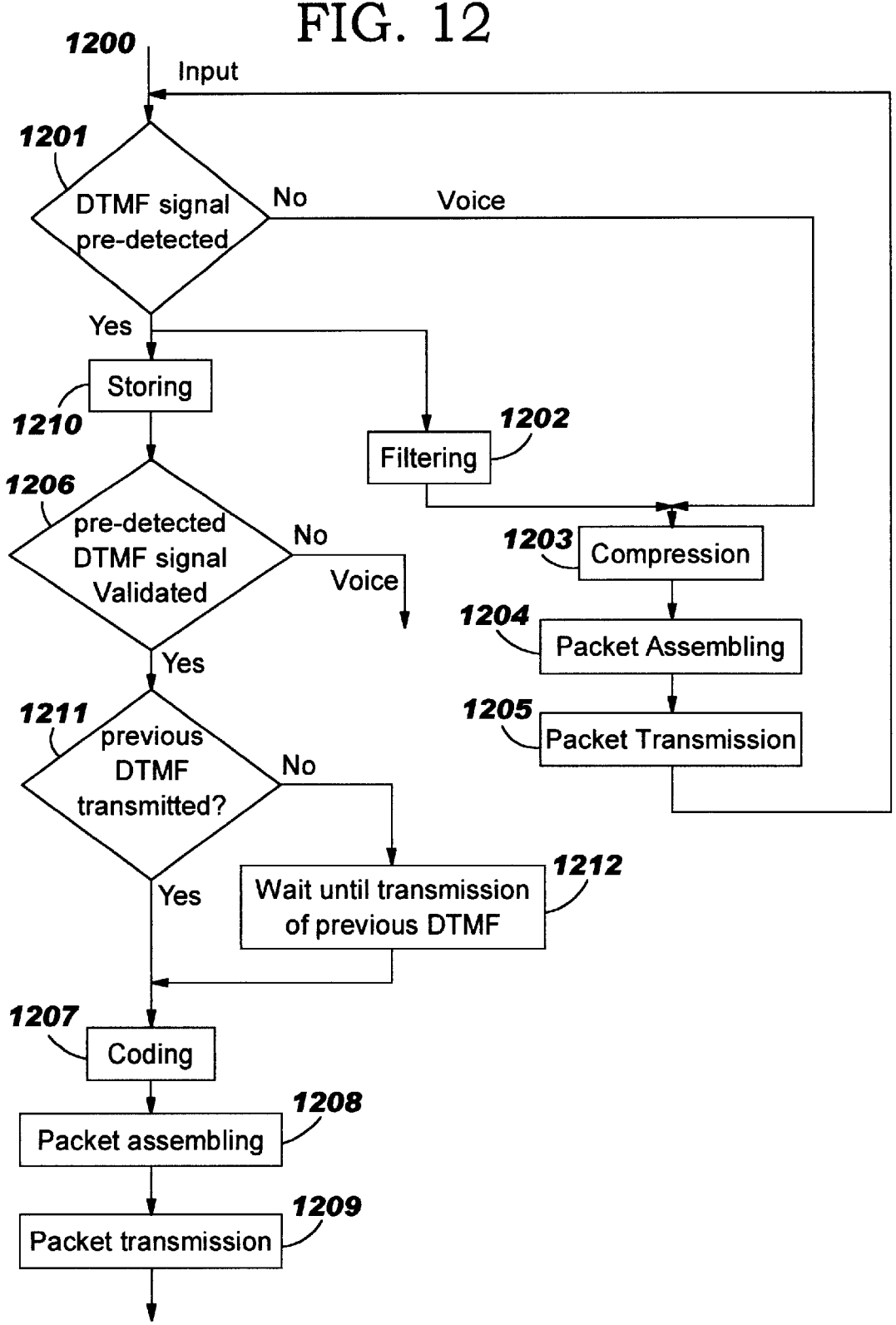
FIG. 12 shows a general flow chart of the DTMF transmission process according to the present invention.

FIG. 12 is a general flow chart of the method of transmitting compressed voice traffic according to the present invention. The method comprises the steps of:

receiving (1200) from a network incoming link an input signal comprising voice traffic and true Dual Tone MultiFrequency (DTMF) signals;

detecting (1201) voice traffic;

pre-detecting (1201) DTMF signals within a given period of time, said pre-detected DTMF signals comprising true DTMF signals or voice traffic;

storing (1210) said pre-detected DTMF signals;

filtering (1202) said pre-detected DTMF signals to remove one of pre-detected DTMF frequencies;

compressing (1203) voice and compressing filtered pre-detected DTMF signals;

building packets (1204) with compressed voice and compressed filtered pre-detected DTMF signal;

transmitting (1205) said compressed voice and compressed filtered pre-detected DTMF signal packets to the destination node;

identifying (1206) within said pre-detected DTMF signals, true DTMF signals from voice traffic and validating true DTMF signals;

retrieving validated DTMF signals;

coding (1207) validated DTMF signals;

building (1208) coded DTMF signal packets with said coded true DTMF signals; and transmitting (1209) said coded DTMF signal packets to the destination node after transmission of the previously stored coded true DTMF signal (1211, 1212).

While there has been described what is considered to be a preferred embodiment of the present invention, variations and modifications therein will occur to those skilled in the art once they learn of the preferred embodiment. It is intended that the appended claims shall be construed to include both the preferred embodiment and all variations and modifications thereto that fall within the true spirit and scope of the invention.

What is claimed is:

1. For use in a source node in a packet switching communication network having a plurality of nodes interconnected with transmission links, a method of transmitting data comprising the steps of:

receiving an input signal comprising voice signals and Dual Tone MultiFrequency (DTMF) signals having two signal components, each at a respective frequency;

detecting candidate DTMF signals in the input signal;

modifying each candidate DTMF signal by filtering the signal component occurring at one of the two frequencies in said candidate DTMF signal;

packetizing the voice signals and modified candidate DTMF signals;

transmitting the resulting packets into the network;

compressing voice signals and modified candidate DTMF signals prior to the step of packetizing such signals;

performing signal verification operations on a candidate DTMF signal to determine whether the signal is a valid DTMF signal;

generating a packet representing a valid DTMF signal; and transmitting said packet into the network;

wherein the packet representing a valid DTMF signal comprises a packet identifier field for identifying the packet as representing a DTMF signal, a key field for identifying the pair of DTMF signals comprising the DTMF signal, a type field for identifying the tone-on and tone-off periods of the DTMF signal, and two energy fields representing, respectively, the energy level of the signal components at one of the two frequencies.

2. A source node for use in a packet switching communication network having a plurality of nodes interconnected with transmission links, said source node comprising:

a Dual Tone MultiFrequency (DTMF) detector for detecting candidate DTMF signals in a received signal comprising voice or DTMF signals wherein each DTMF signal has two signal components, each at a respective frequency;

a filter for modifying each detected candidate DTMF signal by removing the signal component at one of the two frequencies defining said detected candidate DTMF signal;

a packet generator for generating packets representing either voice signals or modified candidate DTMF signals;

a transmit interface for transmitting generated packets into the network;

compression logic for compressing the voice signals and the modified candidate DTMF signals prior to the generation of packets including such signals;

a DTMF verification logic component for determining whether a candidate DTMF signal is a true DTMF signal; and packet generating logic for generating a packet representing the true DTMF signal;

wherein said packet representing a valid DTMF signal comprises a packet identifier field for identifying the packet as representing a DTMF signal, a key field for identifying the pair of DTMF signals comprising the DTMF signal, a type field for identifying the tone-on and tone-off periods of the DTMF signal, and two energy fields representing, respectively, the energy level of the signal components at one of the two frequencies.

3. A method of receiving data for use in a receiving node in a packet switching communication network having a plurality of nodes interconnected with transmission links, comprising the steps of:

receiving an input signal comprising compressed voice signals and packets representing DTMF signals having two signal components, each at a respective frequency;

detecting a packet representing DTMF signals in the received input signal;

reconstituting a DTMF signal represented by said packet; and, transmitting a reconstituted DTMF signal;

wherein the step of reconstituting includes decompressing voice packets and packets representing DTMF signals, and wherein said packets representing DTMF signals comprise a packet identifier field for identifying the packet as representing a DTMF signal;

a key field for identifying the pair of DTMF signal components comprising the DTMF signal;

a type field for identifying the tone-on and tone-off periods of the DTMF signal;

and two energy fields, wherein each energy field represents a level of energy for a signal components at a respective frequency.

4. A destination node for use in a packet switching communication network having a plurality of nodes interconnected with transmission links, said destination node comprising:

an interface unit for detecting compressed DTMF packets in a received signal;

a DTMF generator for creating reconstituted DTMF signals from said DTMF packets, the reconstituted DTMF signals representing modified DTMF signals;

an interface for transmitting the reconstituted DTMF signals, wherein said compressed DTMF packets in a received signal comprise compressed voice signals, compressed DTMF packets, or both; and decompression logic means for decompressing the voice signals and DMTF signal generation logic for reconstituting the DTMF signals prior to transmitting the voice signals and DTMF signals;

wherein the packet representing a valid DTMF signal comprises a packet identifier field for identifying the packet as representing a DTMF signal, a key field for identifying the pair of DTMF signals comprising the DTMF signal, a type field for identifying the tone-on and tone-off periods of the DTMF signal, and two energy fields representing, respectively, the energy level of the signal components at one of the two frequencies.

\* \* \* \* \*